Patented Nov. 13, 1928.

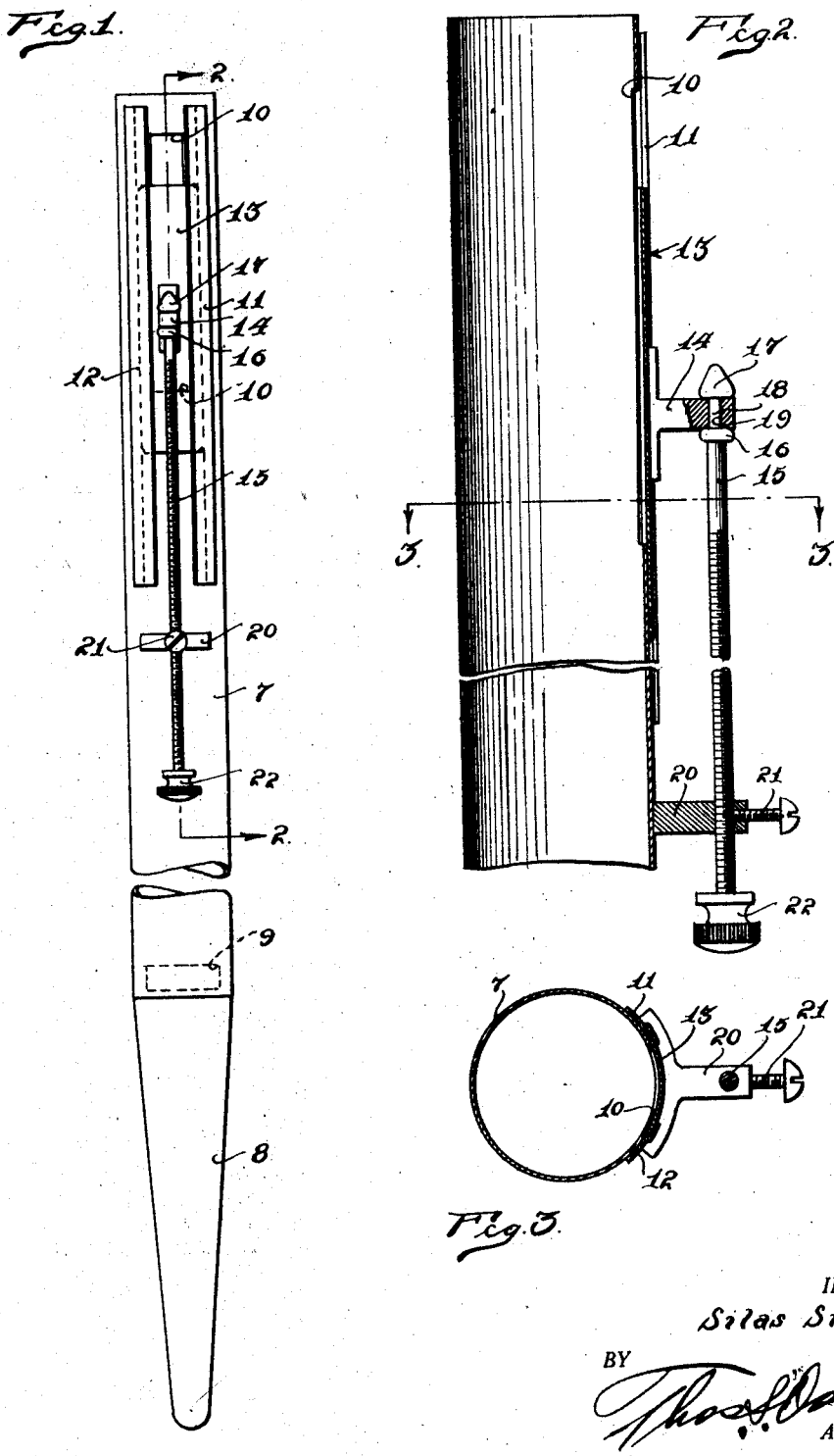

1,691,674

UNITED STATES PATENT OFFICE.

SILAS SILVERS, OF DETROIT, MICHIGAN.

TUNING ATTACHMENT FOR PIPE-ORGAN PIPES.

Application filed April 30, 1926. Serial No. 105,660.

My invention relates to a new and useful improvement in a tuning attachment for organ pipes, and has for its object the provision of a device adapted for attachment on an organ pipe, whereby the pipe may be tuned to produce the desired tune or note when sounded.

It is an object of the present invention to provide a tuning device for organ pipes whereby the pipe may be tuned and the tuning device locked in the desired position of adjustment so that the tuning is a permanent one.

Another object of the invention is the provision of a tuning device of this class which is simple in structure, economical of manufacture, highly efficient in use, easily operated, and quickly and easily locked in positions of various adjustment, and released for adjustment to other positions.

Another object of the invention is the provision of a slidable plate mounted on the pipe for opening and closing by degrees a slot formed in the pipe.

Other objects will appear hereinafter.

The invention consists in the combination and arrangement of parts hereinafter described and claimed.

The invention will be best understood from a reference to the accompanying drawings which form a part of this specification and in which Fig. 1 is a side elevational view of the invention showing it applied to an organ pipe.

Fig. 2 is a fragmentary sectional view taken on substantially line 2—2 of Fig. 1.

Fig. 3 is a sectional view taken on substantially line 3—3 of Fig. 2.

As shown in the drawings the invention is adapted for use with an organ pipe 7 having the tapered or inlet end 8 and provided with the peripheral opening 9, all of which structure is well known. Formed in the tube 7 adjacent the upper end, is a slot 10 at each side of which extending longitudinally of the tube 7 are guide strips 11 and 12 which serve as guides for the tuning plate 13 in its longitudinal movement relatively to the tube 7. By moving the plate 13 the open slot 10 may be adjusted to various sizes thus effecting the pitch and the quality of tone of the pipe or tube and affording a means for tuning the tube to produce the desired tone.

Mounted upon and projecting outwardly from the tuning plate 13 is a bracket 14 in which is rotatably mounted a reduced portion 18 of a threaded stem 15, having the head 16 positioned at one side of the bracket 14 and the head 18 positioned at the opposite side, said bracket 14 having an opening 19 therethrough for receiving the reduced portion 18. Mounted upon and projecting outwardly from the tube 7 is a bracket 20 through which the threaded stem 15 is threaded, a suitable set screw 21 being threaded into the bracket 20 and adapted to engage the stem 15 for locking it against rotatable movement in the bracket 20. A suitable knob 22 is mounted upon one end of the threaded stem 15 for effecting rotation thereof. It is evident that by rotating the stem 15 the tuning plate 13 will be moved longitudinally of the tube 7 so that the open portion of the slot 10 may be adjusted, the movement of the plate 13 downwardly toward the tapered end 8 of the tube uncovering a larger portion of the slot and a movement in the opposite direction serving to effect a closing of the slot to reduce the open portion.

When the tuning plate 13 has been moved to the desired position the set screw 21 may be threaded into engagement with the stem 15 so that the tuning plate is locked in its adjusted position and its undue movement therefrom prevented.

It is evident that a permanent tuning of the tube becomes possible with a device of this kind and that the tuning may be effected positively, accurately, and to a very fine degree so that the device in addition to affording a permanent tuning also renders an efficient mechanism for tuning the pipe quite accurately.

While I have illustrated and described the preferred form of structure, I do not wish to limit myself to the precise form of structure shown but desire to avail myself of such variations and modifications as come within the scope of the appended claims.

Having thus described my invention what I claim as new and desire to secure by Letters Patent is:

1. In combination with a pipe organ having an opening formed therein; a pair of guide members extending along said opening at opposite sides; a tuning plate slidable between said guide members for opening and closing said opening; a threaded member for moving said plate relatively to said opening; and means for locking said threaded member against operation.

2. In combination with an organ pipe having an opening formed therein, a pair of guide members extending longitudinally of said pipe on the periphery thereof, one at each side of said opening; a closure for said opening slidably mounted between said guide members; a bracket projecting outwardly from said closure; a threaded stem projected through said bracket; a head on said stem engaging one side of said bracket; a head on said stem engaging the opposite side of said bracket, the portion of said stem between said brackets being reduced and projected through said bracket, rotatable therein; a bracket mounted on said pipe, said bracket having a threaded opening formed therein for the reception of a threaded portion of said stem, the rotation of said stem in said threaded opening effecting a movement of said plate longitudinally of said pipe and relatively to said opening; and a set screw threaded into said bracket for engaging said stem and locking the same against rotatable movement.

In testimony whereof I have signed the foregoing.

SILAS SILVERS.